Patented Feb. 14, 1933

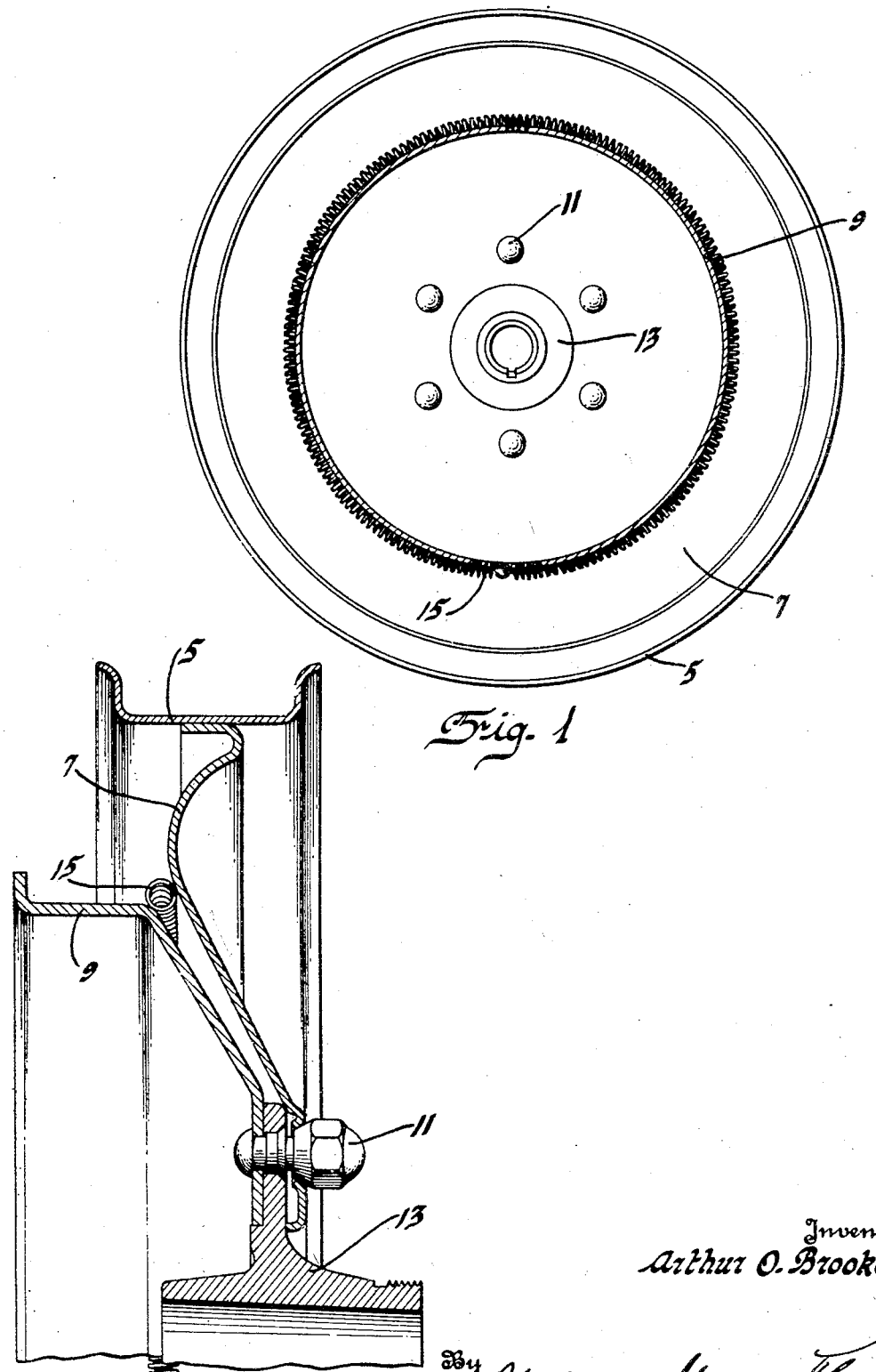

1,897,789

UNITED STATES PATENT OFFICE

ARTHUR O. BROOKE, OF DETROIT, MICHIGAN, ASSIGNOR TO GENERAL MOTORS CORPORATION, OF DETROIT, MICHIGAN, A CORPORATION OF DELAWARE

WHEEL STRUCTURE

Application filed May 28, 1930. Serial No. 456,518.

This invention relates to disc wheels and has been designed particularly to prevent or reduce the noise resulting from the use of such wheels.

An object of the invention is to prevent or greatly reduce the drumming of disc wheels and to prevent the transmission of axle noises by such wheels.

A second object is to prevent the "howling" noises often occurring upon the application of brakes. Other objects, such as economy of manufacture and simplicity in construction and installation will be understood from the following description.

The invention is illustrated by the accompanying drawing in which:

Fig. 1 is a side elevation of a wheel of the disc type equipped with my invention.

Fig. 2 is a vertical section of a portion of such a wheel.

In the drawing numeral 5 is a tire rim and 7 represents a wheel disc of known form carrying the tire rim. At 9 is a brake drum. These parts are secured together by fastening means 11 which also secure said parts to a hub member 13.

It will be seen that a circular coil spring 15 surrounds the brake drum flange 9 at the base of the flange. The wheel disc and the drum form an annular region occupied by the spring 15 as best shown by Fig. 2, the spring 15 thus engaging the drum on one side and the wheel disc on the other.

In the case of disc wheels it has been found that axle noises are sometimes amplified and transmitted by the disc. A disagreeable drumming noise results due to the vibration of the disc. The use of the coil spring as shown has been found to absorb this vibration, and prevent or greatly reduce the noise. As a result disc wheels so equipped are substantially as free from noise as wire wheels. Also the "howling" noise which frequently results in the application of the brakes is prevented or materially reduced owing to the contact of the spring with the flange of the brake drum.

By this simple expedient I am able to avoid the drumming of the disc wheels and the noise resulting from brake application in a way which is inexpensive and highly efficient.

I claim:

1. In combination, a wheel comprising a hub, a disc and a brake drum secured thereto, a coil spring in the form of a circle, said spring being positioned between and engaging both drum and disc.

2. In combination, a wheel comprising a hub, a disc and a brake drum secured thereto, said brake drum having a substantially axial annular flange, said disc and drum together forming a recess of circular shape at the base of the flange, a coil spring of circular outline mounted in said recess and contacting said drum and said disc.

In testimony whereof I affix my signature.

ARTHUR O. BROOKE.